(12) United States Patent
Rodriguez Bravo et al.

(10) Patent No.: US 11,620,412 B2
(45) Date of Patent: Apr. 4, 2023

(54) PREVENTING DAMAGE FROM MALICIOUS HARDWARE

(71) Applicant: KYNDRYL, INC., New York, NY (US)

(72) Inventors: Cesar Augusto Rodriguez Bravo, Alajuela (CR); Franz Friedrich Liebinger Portela, San Pablo de Heredia (CR)

(73) Assignee: Kyndryl, Inc., New York, NY (US)

( * ) Notice: Subject to any disclaimer, the term of this patent is extended or adjusted under 35 U.S.C. 154(b) by 420 days.

(21) Appl. No.: 16/820,929

(22) Filed: Mar. 17, 2020

(65) Prior Publication Data

US 2021/0294922 A1 Sep. 23, 2021

(51) Int. Cl.
| G06F 21/73 | (2013.01) |
| G06F 13/40 | (2006.01) |
| G06F 11/30 | (2006.01) |
| G06F 1/26  | (2006.01) |
| G06F 13/38 | (2006.01) |
| G06F 21/85 | (2013.01) |
| G06F 21/81 | (2013.01) |

(52) U.S. Cl.
CPC .............. *G06F 21/73* (2013.01); *G06F 1/266* (2013.01); *G06F 11/3027* (2013.01); *G06F 13/385* (2013.01); *G06F 13/4077* (2013.01); *G06F 21/81* (2013.01); *G06F 21/85* (2013.01); *G06F 2213/0042* (2013.01); *G06F 2213/3812* (2013.01)

(58) Field of Classification Search
CPC .. G06F 21/73; G06F 1/266; G06F 2213/0042; G06F 2213/3812
See application file for complete search history.

(56) References Cited

U.S. PATENT DOCUMENTS

| 8,386,813 B2 | 2/2013 | Kim |
| 8,700,819 B2 | 4/2014 | Dalal |
| 10,409,734 B1 * | 9/2019 | Patil ...................... G06F 13/102 |
| 2010/0033018 A1 * | 2/2010 | Fukasawa ................ H02J 7/34 |
| | | 320/138 |

(Continued)

FOREIGN PATENT DOCUMENTS

JP 2020016927 A * 1/2020

OTHER PUBLICATIONS

Hama Mikio, 2020, Machine Translation of JP Patent 2020016927, Information Processing Device and Control Method and Program of Information Processing Device, PE2E Tool, note this application filed Jul. 23, 2018 pp. 1-17, (Year: 2020).*

(Continued)

*Primary Examiner* — Ellen Tran
(74) *Attorney, Agent, or Firm* — John Kennel; Andrew M. Calderon; Calderon Safran & Cole, P.C.

(57) ABSTRACT

A hardware device, inserted in a universal serial bus port of a computing device, is detected. A counter is set to an initial value of one. In response to determining that one or more device descriptors associated with the hardware device are not received by the computing device within a predetermined time period, the hardware device is prevented from discharging a high-voltage charge into the computing device by inhibiting the hardware device from storing the high-voltage charge in a capacitor of the hardware device.

20 Claims, 4 Drawing Sheets

(56) References Cited

U.S. PATENT DOCUMENTS

| | | | |
|---|---|---|---|
| 2013/0046881 A1* | 2/2013 | Seel | H04L 12/2809 |
| | | | 709/224 |
| 2014/0337558 A1* | 11/2014 | Powers | G06F 13/42 |
| | | | 710/313 |
| 2015/0318728 A1 | 11/2015 | Ghosh | |
| 2016/0373408 A1 | 12/2016 | Wentworth | |
| 2017/0324237 A1 | 11/2017 | Baumeler | |
| 2018/0097629 A1 | 4/2018 | Soffer | |

OTHER PUBLICATIONS

"Simplified Description of USB Device Enumeration", Future Technology Devices International Ltd., Technical Note TN_113, Document Reference No. FT_000180, Version 1.0, Issue Date: Oct. 28, 2009, Copyright © 2009 Future Technology Devices International Limited, 19 pages.

"Usb Killer Tester", © 2020 USBKill, 4 pages, <https://www.usbkill.com/products/usb-killer-tester>.

"USB Killer Protection", Information Security, Stack Exchange, edited Aug. 2, 2017, 1 page, <https://security.stackexchange.com/questions/166578/usb-killer-protection>.

"Usb Kill", © 2020 USBKill, 8 pages, <https://usbkill.com/>.

Welch, Chris, "Student used 'USB Killer' device to destroy $58,000 worth of college computers", The Verge, Apr. 17, 2019, 3 pages, <https://www.theverge.com/2019/4/17/18412427/college-saint-rose-student-guilty-usb-killer-destroyed-computers>.

\* cited by examiner

PREVENTING DAMAGE FROM MALICIOUS HARDWARE

BACKGROUND

The present invention relates generally to the field of computer security, and more particularly to preventing damage to computing devices from malicious hardware.

A "white hat" computer hacker is a computer expert who uses their technical skills to solve computer problems. "White hat" (e.g., good) hackers are invaluable to many companies world-wide. There are also "black hat" hackers that utilize their technical skills to improperly access computer systems for malicious activities (e.g., stealing information). To perform these malicious activities, "black hat" hackers carry out cybersecurity attacks. These attacks come in many variations. Typically, hackers utilize software attacks for intrusion purposes. Types of software attacks include malware, phishing, SQL (structured query language) injection, cross-site scripting, denial-of-service, man-in-the-middle, spear phishing, "whaling", brute-force spoofing, and ransomware. Frequently, when counter-hacking measures are discovered (e.g., resolving one type of attack), "black hat" hackers create a plurality of new attacks. In addition to software attacks, hardware attacks are also of concern. A hardware attack occurs when a device that a user believes to be benign exposes an attack vector and damages the computing device utilized by the user. Hardware attacks can potentially "brick" (e.g., damage) the computing device so that it is no longer usable.

SUMMARY OF THE INVENTION

Embodiments of the present invention include an approach for preventing damage to computing devices from malicious hardware. In one embodiment, a hardware device, inserted in a universal serial bus port of a computing device, is detected. A counter is set to an initial value of one. In response to determining that one or more device descriptors associated with the hardware device are not received by the computing device within a predetermined time period, the hardware device is prevented from discharging a high-voltage charge into the computing device by inhibiting the hardware device from storing the high-voltage charge in a capacitor of the hardware device.

DETAILED DESCRIPTION

Embodiments of the present invention recognize that cyberattacks can be carried out via both software and hardware. Software attacks can seek personal information such as bank account numbers, credit card numbers, social security numbers, etc. Software attacks can also directly seek money from a user such as when the user is attacked by ransomware which can prevent the user from accessing files unless a ransom is paid. Other types of cyberattacks are hardware based. One such example is that of a hardware device that when inserted into a universal serial bus (USB) port on a computing device can damage the computing device. This malicious type of hardware device uses the USB power lines to charge internal capacitors within the hardware device and when charged, the hardware device discharges high-voltage over the data lines of the computing device with the intent to damage said computing device. The charge/discharge cycle repeats many times per second until the hardware device is physically removed from the computing device or electrically isolated from the computing device. This process can render the computing device unusable resulting in loss of data and expense to the owner.

Embodiments of the present invention recognize that there may be a method, computer program product, and computer system for preventing damage to computing devices from malicious hardware. In an embodiment, the method, computer program product, and computer system recognize when a device is inserted into a USB port and when said device does not behave like a standard USB device (e.g., a thumb drive storage device or a USB powered fan), embodiments of the present invention disable the USB port before the device can perform any malicious actions. Two benefits of this software-based solution is that (i) no additional hardware is needed for the computing device and (ii) the solution can be easily distributed to users via a simple software patch.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
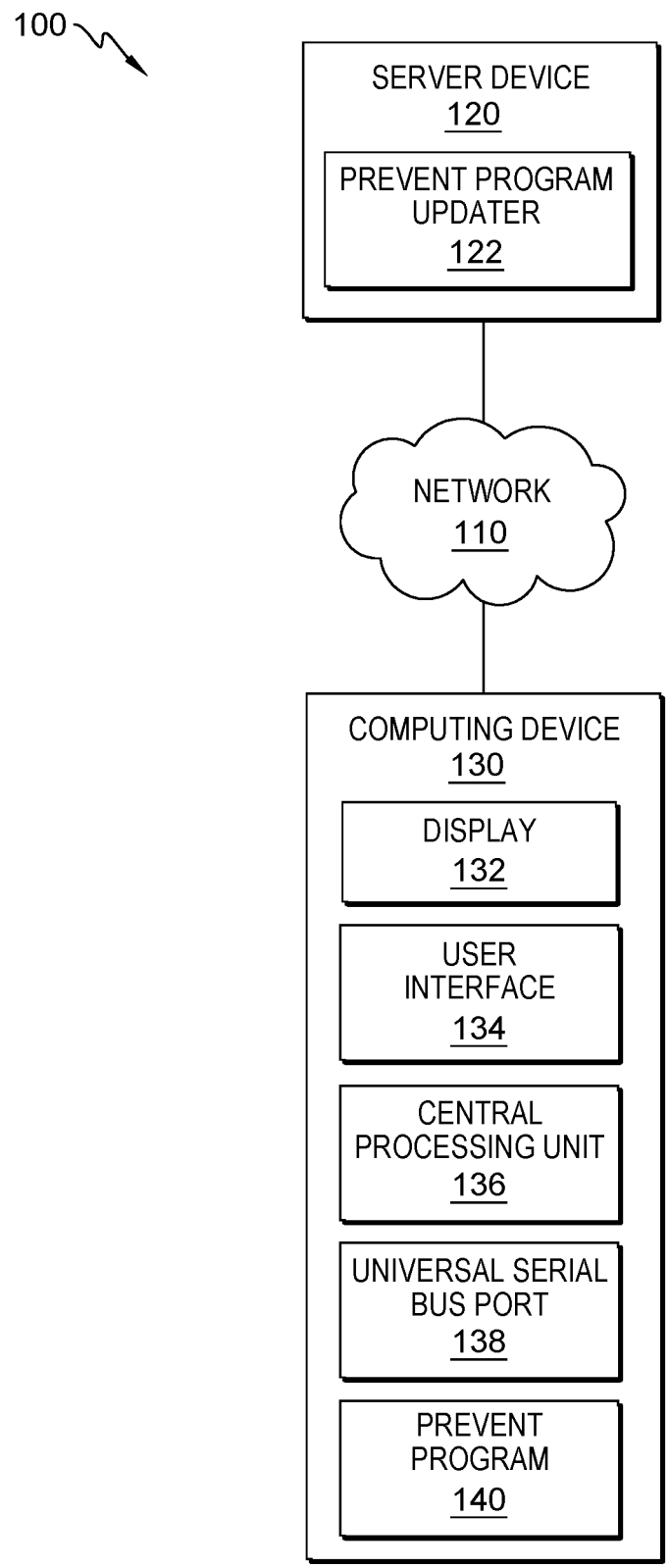
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes server device 120 and computing device 130, interconnected by network 110. In example embodiments, computing environment 100 includes other computing devices (not shown in FIG. 1) such as smartwatches, cell phones, additional smartphones, wearable technology, phablets, tablet computers, additional laptop computers, additional desktop computers, other computer servers or any other computer system known in the art, interconnected with server device 120 and computing device 130 over network 110

In embodiments of the present invention, server device 120 and computing device 130 are connected to network 110, which enables server device 120 and computing device 130 to access other computing devices and/or data not directly stored on server device 120 and computing device 130. Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between server device 120 and computing device 130, and any other computing devices (not shown in FIG. 1) connected to network 110, in accordance with embodiments of the present invention. In an embodiment, data received by another computing device (not shown in FIG. 1) in computing environment 100 is communicated to server device 120 and computing device 130 via network 110.

In an embodiment, server device 120 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server device 120 can be a standalone computing device, a management server, a web server, a mobile computing device, or any other electronic device or computing system capable of receiving, transmitting, and processing data. In other embodiments, server device 120 can represent computing systems utilizing multiple computers as a server system, such as in a cloud computing environment. In certain embodiments, server device 120 represents a computer system utilizing clustered computers and components (e.g., database server computers, application server computers, etc.) that act as a single pool of seamless resources when accessed by elements of computing environment 100. In general, server device 120 is representative of any electronic device or combination of electronic devices capable of executing computer readable program instructions. According to an embodiment of the present invention, computing environment 100 includes any number of server device 120. Server device 120 may include internal and external hardware components as depicted and described in further detail with respect to FIG. 4, in accordance with embodiments of the present invention. In an embodiment, server device 120 includes prevent program updater 122.

According to embodiments of the present invention, prevent program updater 122 is an application used to update a plurality of programs. For example, prevent program updater 122 is able to maintain and update prevent program 140. In an embodiment prevent program updater 122 can provide software patches when required, provide firmware updates as needed, and update current programs to newer versions when they becomes available from application developers.

In an embodiment, computing device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, computing device 130 can be a standalone computing device, a management server, a web server, a mobile computing device, or any other electronic device or computing system capable of receiving, transmitting, and processing data. In other embodiments, computing device 130 can represent computing systems utilizing multiple computers as a server system, such as in a cloud computing environment. In certain embodiments, computing device 130 represents a computer system utilizing clustered computers and components (e.g., database server computers, application server computers, etc.) that act as a single pool of seamless resources when accessed by elements of computing environment 100. In general, computing device 130 is representative of any electronic device or combination of electronic devices capable of executing computer readable program instructions. In an embodiment, computing environment 100 includes any number of computing device 130. Computing device 130 may include internal and external hardware components as depicted and described in further detail with respect to FIG. 4, in accordance with embodiments of the present invention. In one embodiment, computing device 130 includes display 132, user interface 134, central processing unit (CPU) 136, universal serial bus (USB) port 138, and prevent program 140.

According to an embodiment of the present invention, display 132 is an electronic visual device for a desktop computer, laptop computer, tablet computer, smartphone, smart-watch, and the like. Display 132 may include a touchscreen which is an input device layered on top of the display for allowing a user to control an electronic device via simple or multi-touch gestures by touching display 132 with a special stylus and/or one or more fingers. Display 132 displays user interface 134 as well as open programs and applications, allowing a user of computing device 130 to interact with the open programs and applications via a keyboard and mouse (not shown in FIG. 1). Display 132 may be a thin film transistor liquid crystal display (TFT-LCD), a flat panel LED (light emitting diode) display, or a cathode ray tube (CRT). Display 132 may be connected to computing device 130 via VGA (video graphics array), DVI (digital video interface), HDMI (High Definition Multi-Media Interface or any other connection type known in the art.

In an embodiment, user interface 134 provides an interface between a user of computing device 130 and server device 120. User interface 134 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 134 may also be mobile application software that provides an interface between computing device 130 and server device 120. Mobile application software, or an "app," is a computer program designed to run on smartphones, tablet computers and other mobile devices. User interface 134 enables a user of computing device 130 to interact with server device 120, prevent program 140, and any other computing devices not shown in FIG. 1.

According to one embodiment, CPU 136 is the electronic circuitry within computing device 130 that executes instructions that make up a computer program such as prevent program 140. CPU 136 performs basic arithmetic, logic, controlling, and input/output (I/O) operations specified by these instructions. Principal components of CPU 136 (not shown in FIG. 1) include the arithmetic logic unit (ALU)

that performs arithmetic and logic operations, processor registers that supply operands to the ALU and store the results of ALU operations, and a control unit that orchestrates the fetching (from memory) and execution of instructions by directing the coordinated operations of the ALU, registers, and other components.

In an embodiment, USB port 138 is a standard cable connection interface for personal computers and other consumer electronics devices. The term "universal serial bus" in USB port 138 refers to an industry standard for short-distance digital data communications. USB port 138 allows other USB devices to be connected to computing device 130 for the purpose of transferring digital data over USB cables between said devices. Some examples of devices that can be connected to USB port 138 include network adapters, broadband and cellular modems, printers, and memory drives (i.e., thumb drives or "sticks").

According to an embodiment of the present invention, prevent program 140 can be a program, a subprogram of a larger program, an application, a plurality of applications, or mobile application software, which functions to prevent damage to computing devices from malicious hardware. A program is a sequence of instructions written by a programmer to perform a specific task. In an embodiment, prevent program 140 runs by itself. In other embodiments, prevent program 140 depends on system software (not shown in FIG. 1) to execute. In one embodiment, prevent program 140 functions as a stand-alone program residing on computing device 130. In another embodiment, prevent program 140 works in conjunction with other programs, applications, etc., found in computing environment 100. In yet another embodiment, prevent program 140 resides on any computing device within computing environment 100. In yet another embodiment, prevent program 140 resides on other computing devices (not shown in FIG. 1) in computing environment 100, which are interconnected to computing device 130 via network 110.

According to an embodiment, prevent program 140 detects the presence of a USB device inserted into USB port 138 on computing device 130. In the embodiment, prevent program 140 sets a counter. Further in the embodiment, prevent program 140 determines the speed of the USB device. Further yet in the embodiment, prevent program 140 determines the USB device descriptors. Responsive to determining that the USB device descriptors are not received within a certain time, prevent program 140 blocks access to USB port 138.

Figure 2:
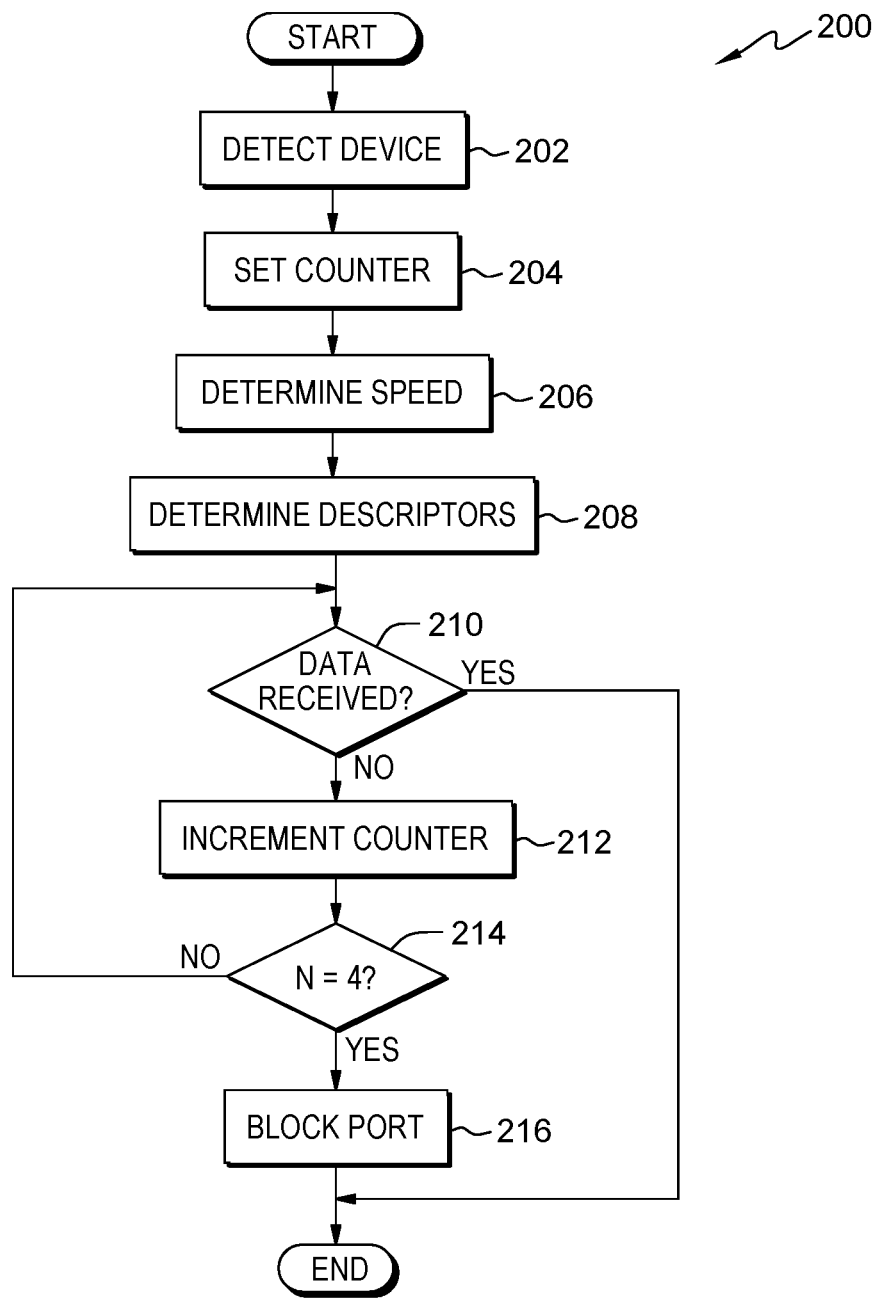
FIG. 2 depicts a flowchart of a program for preventing damage to computing devices from malicious hardware for non-power only Universal Serial Bus devices, in accordance with an embodiment of the present invention.

FIG. 2 is a flowchart of workflow 200 depicting a method for preventing damage to computing devices from malicious hardware. In one embodiment, the method of workflow 200 is performed by prevent program 140. In an alternative embodiment, the method of workflow 200 is performed by any other program working with prevent program 140. In an embodiment, a user of computing device 130 invokes workflow 200 upon powering on computing device 130. In an alternative embodiment, a user of computing device 130 invokes workflow 200 upon accessing prevent program 140 on computing device 130.

In an embodiment, prevent program 140 detects device (step 202). In other words, prevent program 140 detects (i.e., determines) that a hardware device has been inserted into an open universal serial bus (USB) port. A standard USB interface consists of four wires—power, ground, data plus, and data minus. When a hardware device is inserted into the USB port, there is a change on both the data plus and data minus wires (or lines). According to an embodiment of the present invention, prevent program 140 recognizes this change on the data lines to detect that a hardware device has been inserted into a USB port. In an embodiment, prevent program 140 detects the presence of a hardware device in USB port 138 on computing device 130. For example, Jill found a thumb drive (i.e., a USB memory device) in the parking lot of the company where Jill works and wanted to determine who the thumb drive belonged to, so Jill inserted the thumb drive into the USB port on a laptop computer to look for identifying data. A program on the laptop then detected the presence of the thumb drive.

According to an embodiment of the present invention, prevent program 140 sets counter (step 204). In other words, responsive to detecting the presence of a USB hardware device, prevent program 140 sets a counter (not shown in FIG. 1). In an embodiment, the counter is used by prevent program 140 to track the number of attempts of receiving data that are made prior to blocking the USB port. In the embodiment, the counter is set to a value of one (i.e., "N" equals one). According to an embodiment, prevent program 140 sets a counter to a value of "N" equals one. For example, the program on the laptop used by Jill sets an internal counter to a value of one.

In an embodiment, prevent program 140 determines speed (step 206). In other words, prevent program 140 determines the speed of the USB hardware device detected in the USB port. A high-speed USB device (high speed is defined as four hundred eighty megabits per second) inserted into a USB port of a host computer initially appears as a full-speed USB device to the host. The host will attempt to send and receive data packets at high-speed to the USB device which is known as a "J and K chirp". If communication is successful between the host and the USB device, prevent program 140 determines that the USB device is a high-speed device. Conversely, if the communication fails between the host and the USB device, prevent program 140 determines that the USB device is a full-speed device. According to an embodiment, prevent program 140 determines the speed of the USB device inserted into USB port 138 based on the communication pass/fail between computing device 130 and the USB device. For example, the program on the laptop used by Jill determines that the thumb drive is a high-speed device.

In an embodiment, prevent program 140 determines descriptors (step 208). In other words, prevent program 140 determines the descriptors of the USB device so that the USB device can be identified. As known in the art, this is done by a reset of the USB device by the host followed by the host issuing a "Get Device Descriptor" command. The USB device then sends a packet of bytes (i.e., information) with the descriptor length and the actual descriptor. According to an embodiment, because there is no timeout in this process to determine the device descriptors, a malicious USB device has sufficient time to charge its capacitors fully and to discharge said capacitors. The malicious USB device requires eighty-three milliseconds to fully charge its capacitors (at the conditions of five and a half volts at nine-hundred milliamps); therefore, if prevent program 140 blocks the USB port prior to the passing of eighty-three milliseconds, the malicious USB device will not be able to damage the host. In an embodiment, prevent program 140 determines the device descriptors, based on the results of the "Get Device Descriptor" command, for the USB device inserted into USB port 138 on computing device 130. For example, the program on the laptop used by Jill transmits an instruction to the thumb drive to determine the device descriptors.

According to an embodiment of the present invention, prevent program 140 determines whether data is received (decision step 210). In other words, prevent program 140 determines whether valid device descriptor data is received within a specific time. In an embodiment, the specific time is six milliseconds. In another embodiment, the specific time is any time less than twenty-four milliseconds. In yet another embodiment, the specific time is controlled by a system administrator for responding to any new USB devices with different parameters. According to one embodiment (decision step 210, YES branch, prevent program 140 determines that valid device descriptor data is received within the specific time; therefore, prevent program 140 ends as the USB device is behaving properly. According to the embodiment (decision step 210, NO branch), prevent program 140 determines that valid device descriptor data is not received within the specific time; therefore, prevent program 140 proceeds to step 212.

According to an embodiment of the present invention, prevent program 140 increments counter (step 212). In other words, responsive to determining that valid device descriptor data is not received within the specific time, prevent program 140 increments the counter value by one. In an embodiment, the counter value is changed from a value of one to a value of two by incrementing the counter value by one. According to an embodiment of the present invention, prevent program 140 increments the counter (not shown in FIG. 1) value by one. For example, the program on the laptop used by Jill increments the counter value from its original value of one to a new value of two by incrementing the counter value by one.

In an embodiment, prevent program 140 determines whether the counter is at four (decision step 214). In other words, prevent program 140 is designed to limit the number of "attempts" at receiving device descriptor data to a total of three attempts so a counter value of four indicates that that three "attempts" have been made by the host (e.g., computing device 130). In one embodiment (decision step 214, NO branch), prevent program 140 determines that the counter is not at a value of four; therefore, prevent program 140 returns to step 210 to determine whether valid device descriptor data is received. Note that in this embodiment, each time decision step 210 returns a NO value, the counter is incremented by one until the counter value reaches a value of four; this results in three "attempts" at receiving valid data. In the embodiment (decision step 214, YES branch), prevent program 140 determines that the counter is not at a value of four; therefore, prevent program 140 proceeds to step 216.

According to an embodiment of the present invention, prevent program 140 blocks port (step 216). In other words, responsive to the counter value being at a value of four (indicative of a total of three failed "attempts" to receive data and a combined passage of time of eighteen milliseconds which when added to the approximately ten milliseconds required to (i) detect the presence of a USB device, (ii) set the counter, and (iii) determine the speed of the USB device is less time than the eighty-three milliseconds required to fully charge the capacitors in a malicious USB device), prevent program 140 blocks the USB port. In an embodiment, blocking the USB port prevents power from being supplied to the USB port and without power, a malicious USB device is not able to charge its internal capacitors and consequently, is not able to discharge high-voltage (e.g., minus two hundred volts direct current) into the computing device. According to an embodiment, prevent program 140 blocks USB port 138 on computing device 130. For example, since the program on the laptop used by Jill determined that the counter reached a value of four, said program blocks the USB port on the laptop such that Jill cannot access the content on the thumb drive. However, if the program on the laptop had received valid descriptor data within the allowable time frame, the counter value would not reach four and Jill would be able to access the content on the thumb drive to determine the owner of the found thumb drive.

Figure 3:
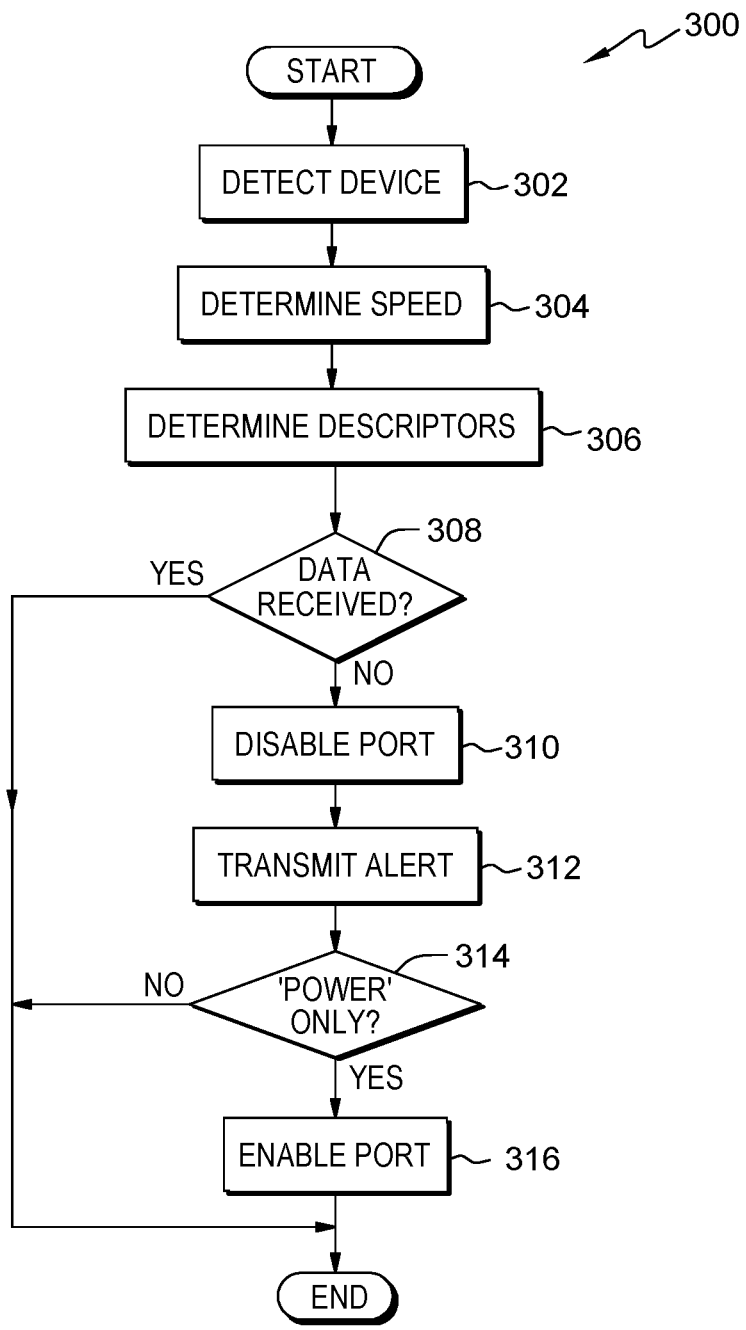
FIG. 3 depicts a flowchart of a program for preventing damage to computing devices from power-only Universal Serial Bus devices, in accordance with an embodiment of the present invention.

FIG. 3 is a flowchart of workflow 300 depicting a method for preventing damage to computing devices from malicious hardware when the USB device is "power only" (i.e., a USB device that does not transmit or receive data). In one embodiment, the method of workflow 300 is performed by prevent program 140. In an alternative embodiment, the method of workflow 300 is performed by any other program working with prevent program 140. In an embodiment, a user of computing device 130 invokes workflow 300 upon powering on computing device 130. In an alternative embodiment, a user of computing device 130 invokes workflow 300 upon accessing prevent program 140 on computing device 130.

In an embodiment, prevent program 140 detects device (step 302). In other words, prevent program 140 detects (i.e., determines) that a hardware device has been inserted into an open universal serial bus (USB) port. A standard USB interface consists of four wires—power, ground, data plus (USBDP), and data minus (USBDM). With no hardware device inserted into the USB port, USBDP and USBDM are both connected to ground via fifteen thousand ohm resistors (this is the standard configuration of a USB port as known in the art). When a hardware device is inserted into the USB port, there is a change on both the USBDP and USBDM wires (or lines). According to an embodiment of the present invention, prevent program 140 recognizes this change on the data lines to detect that a hardware device has been inserted into a USB port. In an embodiment, prevent program 140 detects the presence of a hardware device in USB port 138 on computing device 130. For example, a program on a laptop computer used by Fred detects that a USB device was plugged into the USB port on the laptop. Because Fred is feeling warm, Fred decided to plug in a USB powered fan.

According to an embodiment, prevent program 140 determines speed (step 304). In other words, prevent program 140 determines the speed of the USB hardware device detected in the USB port. A low-speed USB device (low speed is defined as one and one-half megabits per second) uses a fifteen thousand ohm pull-up resistor connected to the power line on the USBDM signal line while a full-speed USB device (full speed is defined as twelve megabits per second) uses a fifteen thousand pull-up resistor connected to the power line on the USBDP signal line. A high-speed USB device (high speed is defined as four hundred eighty megabits per second) inserted into a USB port of a host computer initially appears as a full-speed USB device to the host. The host will attempt to send and receive data packets at high-speed to the USB device which is known as a "J and K chirp". If communication is successful between the host and the USB device, it is determined that the USB device is a high-speed device. Conversely, if the communication fails between the host and the USB device, it is determined that the USB device is a full-speed device. According to an embodiment, prevent program 140 determines the speed of the USB device inserted into USB port 138 based on the communication pass/fail between computing device 130 and the USB device. For example, the program on the laptop used by Fred determines that the fan is a high-speed device.

In an embodiment, prevent program 140 determines descriptors (step 306). In other words, prevent program 140 determines the descriptors of the USB device so that the USB device can be identified. As known in the art, this is done by a reset of the USB device by the host followed by the host issuing a "Get Device Descriptor" command. The USB device then sends a packet of bytes (i.e., information) with the descriptor length and the actual descriptor. According to an embodiment, because there is no timeout in this process to determine the device descriptors, a malicious USB device has sufficient time to charge its capacitors fully and to discharge said capacitors. The malicious USB device requires eighty-three milliseconds to fully charge its capacitors (at the conditions of five and a half volts at nine-hundred milliamps); therefore, if prevent program 140 blocks the USB port prior to the passing of eighty-three milliseconds, the malicious USB device will not be able to damage the host. In an embodiment, prevent program 140 determines the device descriptors, based on the results of the "Get Device Descriptor" command, for the USB device inserted into USB port 138 on computing device 130. For example, the program on the laptop used by Fred transmits an instruction to the USB powered fan to determine the device descriptors.

According to an embodiment of the present invention, prevent program 140 determines whether data is received (decision step 308). In other words, prevent program 140 determines whether valid device descriptor data is received within a specific time. In an embodiment, the specific time is sixteen milliseconds. In another embodiment, the specific time is any time less than 83 milliseconds. In yet another embodiment, the specific time is controlled by a system administrator for responding to any new USB devices with different parameters. According to one embodiment (decision step 308, YES branch, prevent program 140 determines that valid device descriptor data is received within the specific time; therefore, prevent program 140 ends without disabling the USB port as the USB device is behaving properly. According to the embodiment (decision step 308, NO branch), prevent program 140 determines that valid device descriptor data is not received within the specific time; therefore, prevent program 140 proceeds to step 310.

In an embodiment, prevent program 140 disables port (step 310). In other words, responsive to determining that valid device descriptor data was not received within the specific time, prevent program 140 disables the USB port. In an embodiment, disabling (i.e., blocking) the USB port prevents power from being supplied to the USB port and without power, a malicious USB device is not able to charge its internal capacitors and consequently, is not able to discharge high-voltage into the computing device. According to an embodiment, prevent program 140 disables USB port 138 on computing device 130. For example, since the program on the laptop used by Fred did not receive valid descriptor data within the allotted time of sixteen milliseconds, said program blocks the USB port on the laptop and the USB fan does not power on.

According to an embodiment, prevent program 140 transmits alert (step 312). In other words, responsive to disabling the USB port, prevent program 140 transmits an alert to the user of the computing device. In an embodiment, the transmitted alert can be a visual alert displayed for the user to read and an audible alert for the user to hear. In the embodiment, the transmitted alert is a query to the user, asking whether the user has connected a generic USB power-only type of device that only uses power from the USB port and does not exchange data via the USB port. According to an embodiment, prevent program 140 transmits an alert to the user by displaying a query message in display 132 via user interface 134 on computing device 130. For example, the program on the laptop used by Fred transmits an alert to Fred by playing an audio recording asking Fred if the USB device is a power-only type of device.

In an embodiment, prevent program 140 determines whether the detected device is "power only" (decision step 314). In other words, prevent program 140 determines whether the user has acknowledged the transmitted alert indicating that the USB device is a power-only type of device. In one embodiment (decision step 314, NO branch), prevent program 140 determines that the user has not acknowledged that the USB device is a power-only type of device; therefore, prevent program 140 ends, thereby leaving the USB port disabled. In the embodiment (decision step 314, YES branch), prevent program 140 determines that the user has acknowledged that the USB device is a power-only type of device; therefore, prevent program 140 proceeds to step 316.

According to an embodiment, prevent program 140 enables port (step 316). In other words, responsive to determining that the user has acknowledged that the USB device is a power-only type of device, prevent program 140 enables the USB port. In an embodiment, prevent program 140 enables the USB by allowing the USB port to be powered by the host computing device. According to an embodiment of the present invention, prevent program 140 enables USB port 138 on computing device 130. For example, the program on the laptop computer used by Fred allows power from the laptop to reach the USB port so that the USB fan connected by Fred will operate properly and cool Fred off.

Figure 4:
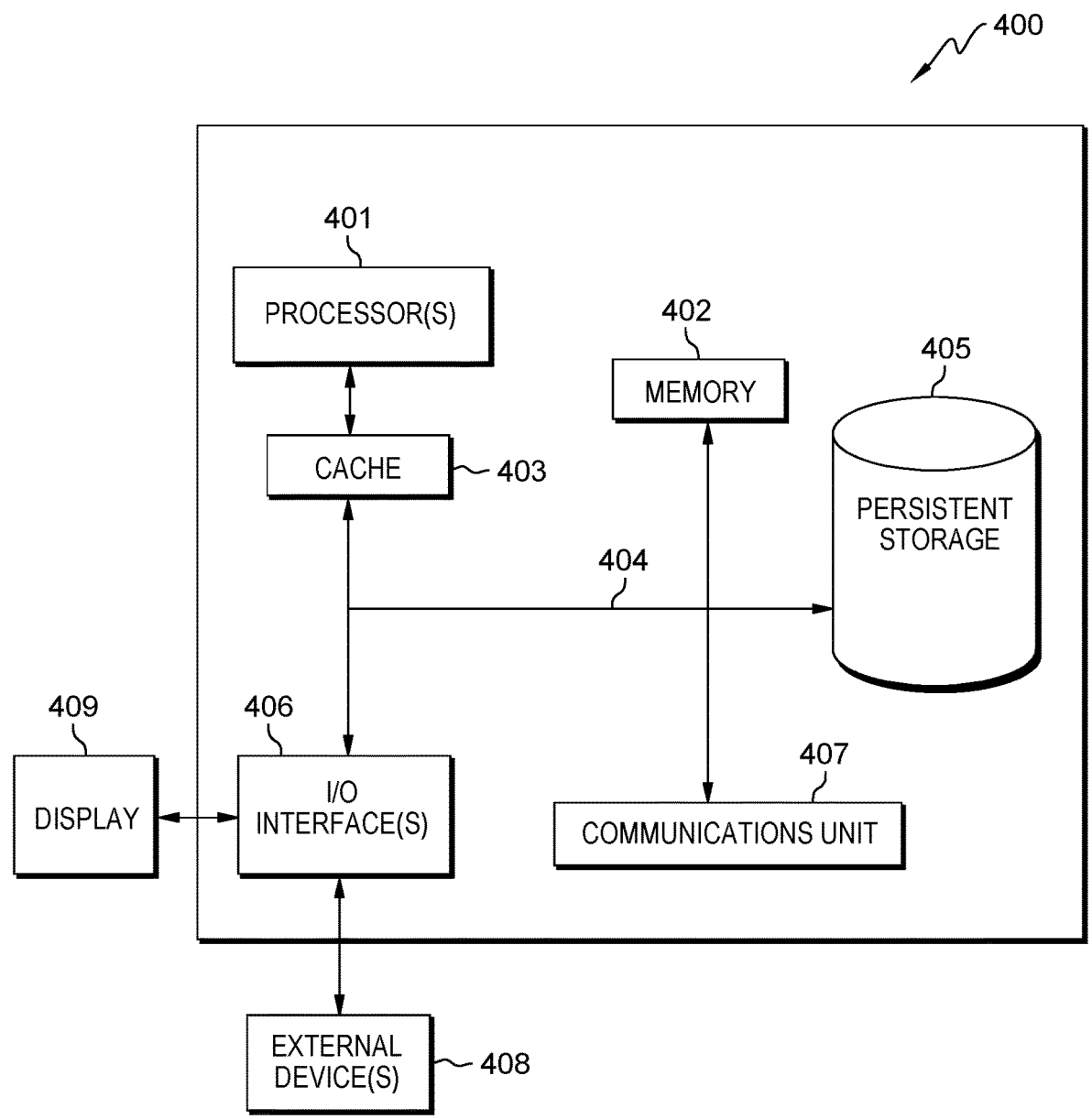
FIG. 4 depicts a block diagram of components of the computing environment of FIG. 1, in accordance with an embodiment of the present invention.

FIG. 4 depicts computer system 400, which is an example of a system that includes prevent program 140. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. PO interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
   detecting, by one or more computer processors, a hardware device that has been inserted in a universal serial bus (USB) port of a computing device;
   responsive to detecting the hardware device, setting, by one or more computer processors, a counter to an initial value; and
   responsive to determining that one or more device descriptors associated with the hardware device are not received from the detected hardware device by the computing device within a predetermined time period for responding to a new device, preventing, by one or more computer processors, the hardware device from discharging a high-voltage charge into the computing device by inhibiting the hardware device from storing the high-voltage charge in a capacitor of the hardware device.

2. The method of claim 1, wherein the step of preventing, by one or more computer processors, the hardware device from discharging a high-voltage charge into the computing device by inhibiting the hardware device from storing the high-voltage charge in a capacitor of the hardware device, comprises:
   determining, by one or more computer processors, one or more device descriptors of the detected hardware device;
   determining, by one or more computer processors, whether the one or more device descriptors are determined within a first predetermined time period;
   responsive to determining that the one or more device descriptors are not determined within the first predetermined time period, incrementing, by one or more computer processors, the counter by a value of one more than a previous value;
   determining, by one or more computer processors, whether a first new value of the counter is equal to a predetermined value of the counter; and
   responsive to determining that the first new value of the counter is equal to the predetermined value of the counter, blocking, by one or more computer processors, the USB port, wherein blocking the USB port prevents power from being supplied to the USB port.

3. The method of claim 2, further comprising:
   responsive to determining that the first new value of the counter is not equal to the predetermined value of the counter, determining, by one or more computer processors, whether the one or more device descriptors are determined within a second predetermined time period;
   responsive to determining that the one or more device descriptors are not determined within the second predetermined time period, incrementing, by one or more computer processors, the counter by a value of one more than a previous value;
   determining, by one or more computer processors, whether a second new value of the counter is equal to the predetermined value of the counter; and
   responsive to determining that the second new value of the counter is equal to the predetermined value of the counter, blocking, by one or more computer processors, the USB port.

4. The method of claim 3, further comprising:
   responsive to determining that the second new value of the counter is not equal to the predetermined value of the counter, determining, by one or more computer processors, whether the one or more device descriptors are determined within a third predetermined time period;
   responsive to determining that the one or more device descriptors are not determined within the third predetermined time period, incrementing, by one or more computer processors, the counter by a value of one;
   determining, by one or more computer processors, whether a third new value of the counter is equal to the predetermined value of the counter; and
   responsive to determining that the third new value of the counter is equal to the predetermined value of the counter, blocking, by one or more computer processors, the USB port.

5. The method of claim 1, further comprising:
   responsive to determining that the one or more device descriptors are determined within any of the first, second, and third predetermined time periods, ending, by one or more computer processors, the method with the USB port active.

6. The method of claim 1, further comprising:
   responsive to determining that the one or more device descriptors are not determined within a fourth predetermined time period, disabling, by one or more computer processers, the USB port so that power is not supplied to the USB port;
   responsive to disabling the USB port, transmitting, by one or more computer processors, an alert and a query to a user of the computing device, asking whether the user has connected a generic USB power-only type of device that only uses power from the USB port and does not exchange data via the USB port;
   receiving, by one or more computer processors, an acknowledgement from the user;

determining, by one or more computer processors, that the received acknowledgement from the user acknowledges that the user has inserted a power-only device into the USB port, wherein a power-only device is a USB device that only uses power from the USB port without exchanging data via the USB port; and responsive to receiving the acknowledgement from the user, enabling, by one or more computer processors, the USB port.

7. The method of claim 6, further comprising:

responsive to not receiving the acknowledgment from the user, ending, by one or more computer processors, the method with the USB port disabled.

8. A computer program product comprising:

one or more computer readable storage media; and program instructions stored on the one or more computer readable storage media, the program instructions comprising:

program instructions to detect a hardware device that has been inserted in a universal serial bus (USB) port of a computing device;

responsive to detecting the hardware device, program instructions to set a counter to an initial value; and responsive to determining that one or more device descriptors associated with the hardware device are not received from the detected hardware device by the computing device within a predetermined time period for responding to a new device, program instructions to prevent the hardware device from discharging a high-voltage charge into the computing device by inhibiting the hardware device from storing the high-voltage charge in a capacitor of the hardware device.

9. The computer program product of claim 8, wherein the program instructions to prevent the hardware device from discharging a high-voltage charge into the computing device by inhibiting the hardware device from storing the high-voltage charge in a capacitor of the hardware device, comprises:

program instructions to determine one or more device descriptors of the detected hardware device;

program instructions to determine whether the one or more device descriptors are determined within a first predetermined time period;

responsive to determining that the one or more device descriptors are not determined within the first predetermined time period, program instructions to increment the counter by a value of one more than a previous value;

program instructions to determine whether a first new value of the counter is equal to a predetermined value of the counter; and responsive to determining that the first new value of the counter is equal to the predetermined value of the counter, program instructions to block the USB port, wherein blocking the USB port prevents power from being supplied to the USB port.

10. The computer program product of claim 9, further comprising program instructions stored on the one or more computer readable storage media, to:

responsive to determining that the first new value of the counter is not equal to the predetermined value of the counter, determine whether the one or more device descriptors are determined within a second predetermined time period;

responsive to determining that the one or more device descriptors are not determined within the second predetermined time period, increment the counter by a value of one more than a previous value;

determine whether a second new value of the counter is equal to the predetermined value of the counter; and responsive to determining that the second new value of the counter is equal to the predetermined value of the counter, block the USB port.

11. The computer program product of claim 10, further comprising program instructions stored on the one or more computer readable storage media, to:

responsive to determining that the second new value of the counter is not equal to the predetermined value of the counter, determine whether the one or more device descriptors are determined within a third predetermined time period;

responsive to determining that the one or more device descriptors are not determined within the third predetermined time period, increment the counter by a value of one;

determine whether a third new value of the counter is equal to the predetermined value of the counter; and responsive to determining that the third new value of the counter is equal to the predetermined value of the counter, block the USB port.

12. The computer program product of claim 8, further comprising program instructions stored on the one or more computer readable storage media, to:

responsive to determining that the one or more device descriptors are determined within any of the first, second, and third predetermined time periods, end the method with the USB port active.

13. The computer program product of claim 8, further comprising program instructions stored on the one or more computer readable storage media, to:

responsive to determining that the one or more device descriptors are not determined within a fourth predetermined time period, disable the USB port so that power is not supplied to the USB port;

responsive to disabling the USB port, transmit an alert and a query to a user of the computing device, asking whether the user has connected a generic USB power-only type of device that only uses power from the USB port and does not exchange data via the USB port;

receive an acknowledgement from the user;

determine that the received acknowledgement from the user acknowledges that the user has inserted a power-only device into the USB port, wherein a power-only device is a USB device that only uses power from the USB port without exchanging data via the USB port; and responsive to receiving the acknowledgement from the user, enable the USB port.

14. The computer program product of claim 13, further comprising program instructions stored on the one or more computer readable storage media, to:

responsive to not receiving the acknowledgment from the user, end the method with the USB port disabled.

15. A computer system comprising:

one or more computer processors;

one or more computer readable storage media; and program instructions stored on the one or more computer readable storage media for execution by at least one of the one or more computer processors, the program instructions comprising:

program instructions to detect a hardware device that has been inserted in a universal serial bus (USB) port of a computing device;

responsive to detecting the hardware device, program instructions to set a counter to an initial value; and responsive to determining that one or more device descriptors associated with the hardware device are not received from the detected hardware device by the computing device within a predetermined time period for responding to a new device, program instructions to prevent the hardware device from discharging a high-voltage charge into the computing device by inhibiting the hardware device from storing the high-voltage charge in a capacitor of the hardware device.

16. The computer system of claim 15, wherein the program instructions to prevent the hardware device from discharging a high-voltage charge into the computing device by inhibiting the hardware device from storing the high-voltage charge in a capacitor of the hardware device, comprise:

program instructions to determine one or more device descriptors of the detected hardware device;

program instructions to determine whether the one or more device descriptors are determined within a first predetermined time period;

responsive to determining that the one or more device descriptors are not determined within the first predetermined time period, program instructions to increment the counter by a value of one more than a previous value;

program instructions to determine whether a first new value of the counter is equal to a predetermined value of the counter; and responsive to determining that the first new value of the counter is equal to the predetermined value of the counter, program instructions to block the USB port, wherein blocking the USB port prevents power from being supplied to the USB port.

17. The computer system of claim 16, further comprising program instructions stored on the one or more computer readable storage media for execution by at least one of the one or more computer processors, to responsive to determining that the first new value of the counter is not equal to the predetermined value of the counter, determine whether the one or more device descriptors are determined within a second predetermined time period;

responsive to determining that the one or more device descriptors are not determined within the second predetermined time period, increment the counter by a value of one more than a previous value;

determine whether a second new value of the counter is equal to the predetermined value of the counter; and responsive to determining that the second new value of the counter is equal to the predetermined value of the counter, block the USB port.

18. The computer system of claim 17, further comprising program instructions stored on the one or more computer readable storage media for execution by at least one of the one or more computer processors, to responsive to determining that the second new value of the counter is not equal to the predetermined value of the counter, determine whether the one or more device descriptors are determined within a third predetermined time period;

responsive to determining that the one or more device descriptors are not determined within the third predetermined time period, increment the counter by a value of one;

determine whether a third new value of the counter is equal to the predetermined value of the counter; and responsive to determining that the third new value of the counter is equal to the predetermined value of the counter, block the USB port.

19. The computer system of claim 15, further comprising program instructions stored on the one or more computer readable storage media for execution by at least one of the one or more computer processors, to responsive to determining that the one or more device descriptors are determined within any of the first, second, and third predetermined time periods, end the method with the USB port active.

20. The computer system of claim 15, further comprising program instructions stored on the one or more computer readable storage media for execution by at least one of the one or more computer processors, to responsive to determining that the one or more device descriptors are not determined within a fourth predetermined time period, disable the USB port so that power is not supplied to the USB port;

responsive to disabling the USB port, transmit an alert and a query to a user of the computing device, asking whether the user has connected a generic USB power-only type of device that only uses power from the USB port and does not exchange data via the USB port;

receive an acknowledgement from the user;

determine that the received acknowledgement from the user acknowledges that the user has inserted a power-only device into the USB port, wherein a power-only device is a USB device that only uses power from the USB port without exchanging data via the USB port; and responsive to receiving the acknowledgement from the user, enable the USB port.

* * * * *